US008963839B2

(12) United States Patent
Liu et al.

(10) Patent No.: US 8,963,839 B2
(45) Date of Patent: Feb. 24, 2015

(54) WIRELESS MOUSE AND WIRELESS INPUT DEVICE

(75) Inventors: Lin Liu, Taipei (TW); Chien-Hsin Lee, Taipei (TW)

(73) Assignees: Lite-On Electronics (Guanzhou) Limited, Guangzhou (CN); Lite-On Technology Corp., Taipei (TW)

( * ) Notice: Subject to any disclaimer, the term of this patent is extended or adjusted under 35 U.S.C. 154(b) by 102 days.

(21) Appl. No.: 13/486,268

(22) Filed: Jun. 1, 2012

(65) Prior Publication Data

US 2013/0063353 A1 Mar. 14, 2013

(30) Foreign Application Priority Data

Sep. 14, 2011 (CN) ...................... 2011 2 0351161 U

(51) Int. Cl.
*G06F 3/033* (2013.01)
(52) U.S. Cl.
CPC ....................................... *G06F 3/033* (2013.01)
USPC .......................................................... 345/163
(58) Field of Classification Search
USPC .......................................................... 345/163
See application file for complete search history.

(56) References Cited

U.S. PATENT DOCUMENTS

| 6,225,981 | B1 * | 5/2001 | Lu .................................. | 345/164 |
|---|---|---|---|---|
| 6,411,281 | B1 * | 6/2002 | Sasselli et al. ................ | 345/163 |
| 6,609,421 | B2 | 8/2003 | Cronin et al. | |
| 7,659,884 | B2 * | 2/2010 | Chang ........................... | 345/163 |
| 2002/0024502 | A1 * | 2/2002 | Iwasaki ......................... | 345/163 |
| 2002/0140678 | A1 * | 10/2002 | Kawashima et al. ......... | 345/166 |
| 2005/0012719 | A1 * | 1/2005 | Su .................................. | 345/163 |
| 2005/0146504 | A1 * | 7/2005 | Huang et al. .................. | 345/163 |
| 2006/0038779 | A1 * | 2/2006 | Li .................................. | 345/163 |
| 2006/0044270 | A1 * | 3/2006 | Chen .............................. | 345/163 |
| 2009/0174659 | A1 * | 7/2009 | Chiang et al. ................. | 345/163 |
| 2009/0225029 | A1 * | 9/2009 | Wu ................................ | 345/163 |
| 2011/0115708 | A1 * | 5/2011 | Lee ............................... | 345/163 |

* cited by examiner

*Primary Examiner* — Dorothy Harris
(74) *Attorney, Agent, or Firm* — Rosenberg, Klein & Lee

(57) ABSTRACT

A wireless mouse includes a base, a battery fastener and a top cover. The base has a top portion that is formed with a battery container unit. The battery fastener includes a fastener body connected removably with the top portion of the base. The battery fastener further includes a blockade unit extending from the fastener body and disposed directly above the battery container unit so as to prohibit the battery unit from exiting the battery container unit. The top cover is connected removably with the base for covering the battery container unit. When the top cover is connected with the base, the battery fastener is located between the top portion of the base and the top cover.

14 Claims, 14 Drawing Sheets

WIRELESS MOUSE AND WIRELESS INPUT DEVICE

CROSS-REFERENCE TO RELATED APPLICATION

This application claims priority of Chinese Application No. 201120351161.7, filed on Sep. 14, 2011.

BACKGROUND OF THE INVENTION

1. Field of the Invention

The invention relates to a mouse, more particularly to a wireless mouse.

2. Description of the Related Art

As a pointing device, a mouse has been widely utilized in personal computers and laptops. Recently, a wireless feature has been introduced to the mouse, such that a user can have a relatively unlimited use of the mouse. A conventional wireless mouse includes a base and a receiver connected with the computer for data transmission between the wireless mouse and the computer. Since the base and the receiver of the wireless mouse are two separate members, and since the receiver is made relatively small, storage of the receiver becomes an important issue (As addressed in Taiwanese Invention Patent No. I296770, I265445 and Taiwanese Utility Model Patent Publication No. 545648).

In another aspect, in order to provide the power needed to transmit wireless signals between the wireless mouse and the computer, the base of the mouse must be installed with a battery unit. However, since the battery unit needs to be attached firmly in the base of the wireless mouse, and detachment of the battery unit from the base due to an external force needs to be prevented, an appropriate securing mechanism for the battery unit is also needed.

SUMMARY OF THE INVENTION

Therefore, the object of the present invention is to provide a wireless mouse that is configured to secure a battery unit received therein.

Another object of the present invention is to provide a wireless mouse that is configured to secure the battery unit and to receive a wireless receiver when the wireless receiver is not connected to a computer.

Accordingly, a wireless mouse of the present invention includes a base, a battery fastener and a top cover.

The base has a top portion that is formed with a battery container unit. The battery fastener includes a fastener body connected removably with the top portion of the base. The battery fastener further includes a blockade unit extending from the fastener body and disposed directly above the battery container unit so as to prohibit the battery unit from exiting the battery container unit. The top cover is connected removably with the base for covering the battery container unit. When the top cover is connected with the base, the battery fastener is located between the top portion of the base and the top cover.

Yet another object of the present invention is to provide a wireless input device that has the advantages of the aforementioned wireless mouse.

Accordingly, a wireless input device of the present invention includes a wireless mouse and a wireless receiver.

The wireless mouse includes a base, a battery fastener and a top cover.

The base has a top portion that is formed with a battery container unit. The battery fastener includes a fastener body connected removably with the top portion of the base. The battery fastener further includes a blockade unit extending from the fastener body and disposed directly above the battery container unit so as to prohibit the battery unit from exiting the battery container unit. The top cover is connected removably with the base for covering the battery container unit. When the top cover is connected with the base, the battery fastener is located between the top portion of the base and the top cover.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
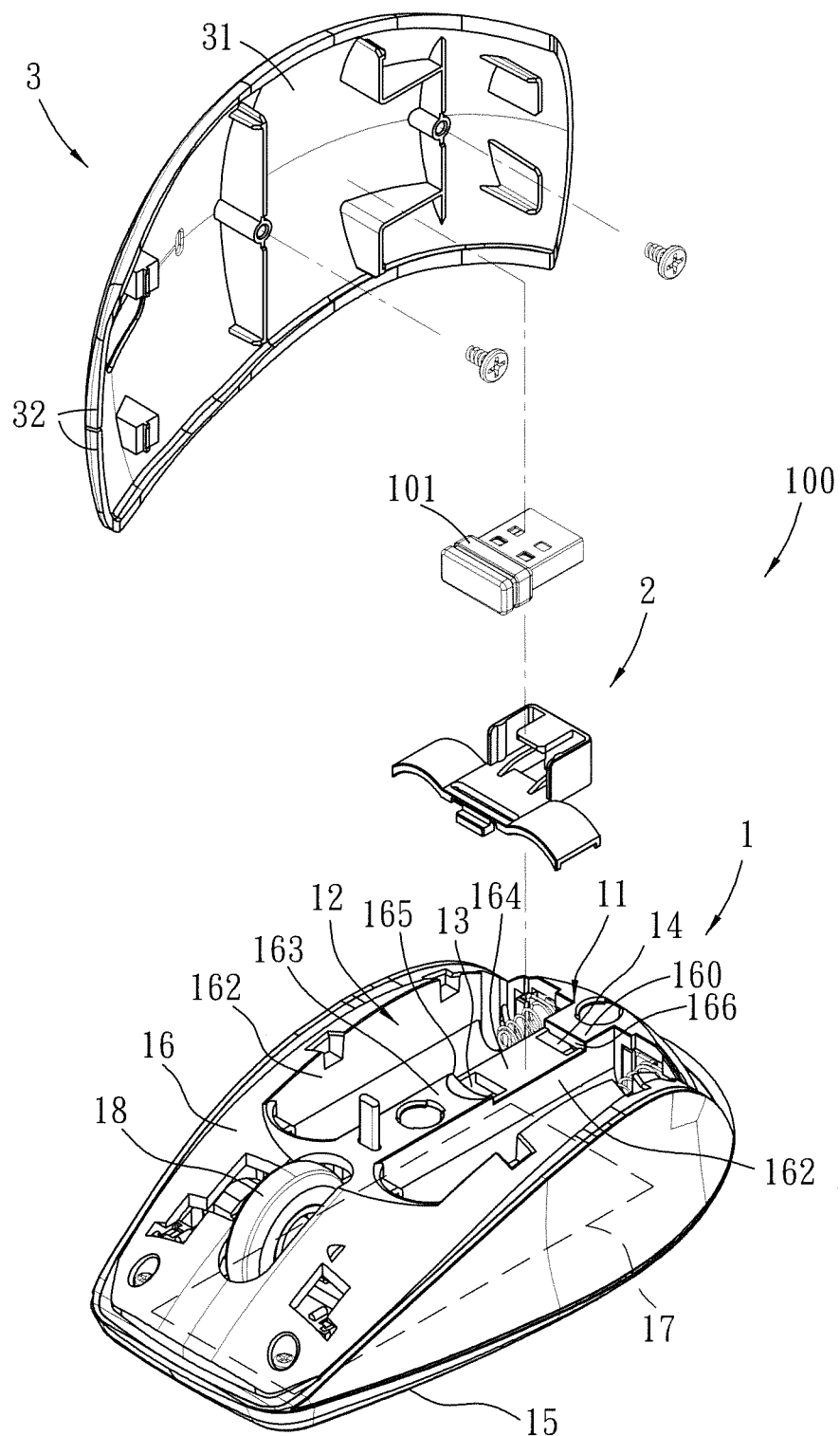
FIG. 1 is an exploded perspective view of a first embodiment of a wireless mouse according to the invention.

Before the present invention is described in greater detail, it should be noted that like elements are denoted by the same reference numerals throughout the disclosure.

Figure 2:
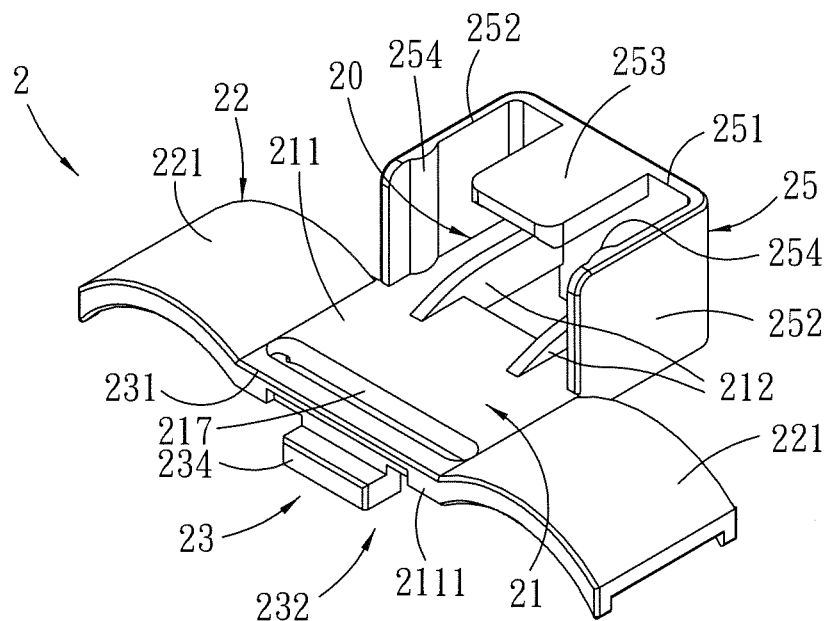
FIG. 2 is a perspective view of a battery fastener of the first embodiment.

As shown in FIGS. 1 and 2, a first preferred embodiment of a wireless mouse 100 according to the present invention includes a base 1, a battery fastener 2 and a top cover 3.

Figure 5:
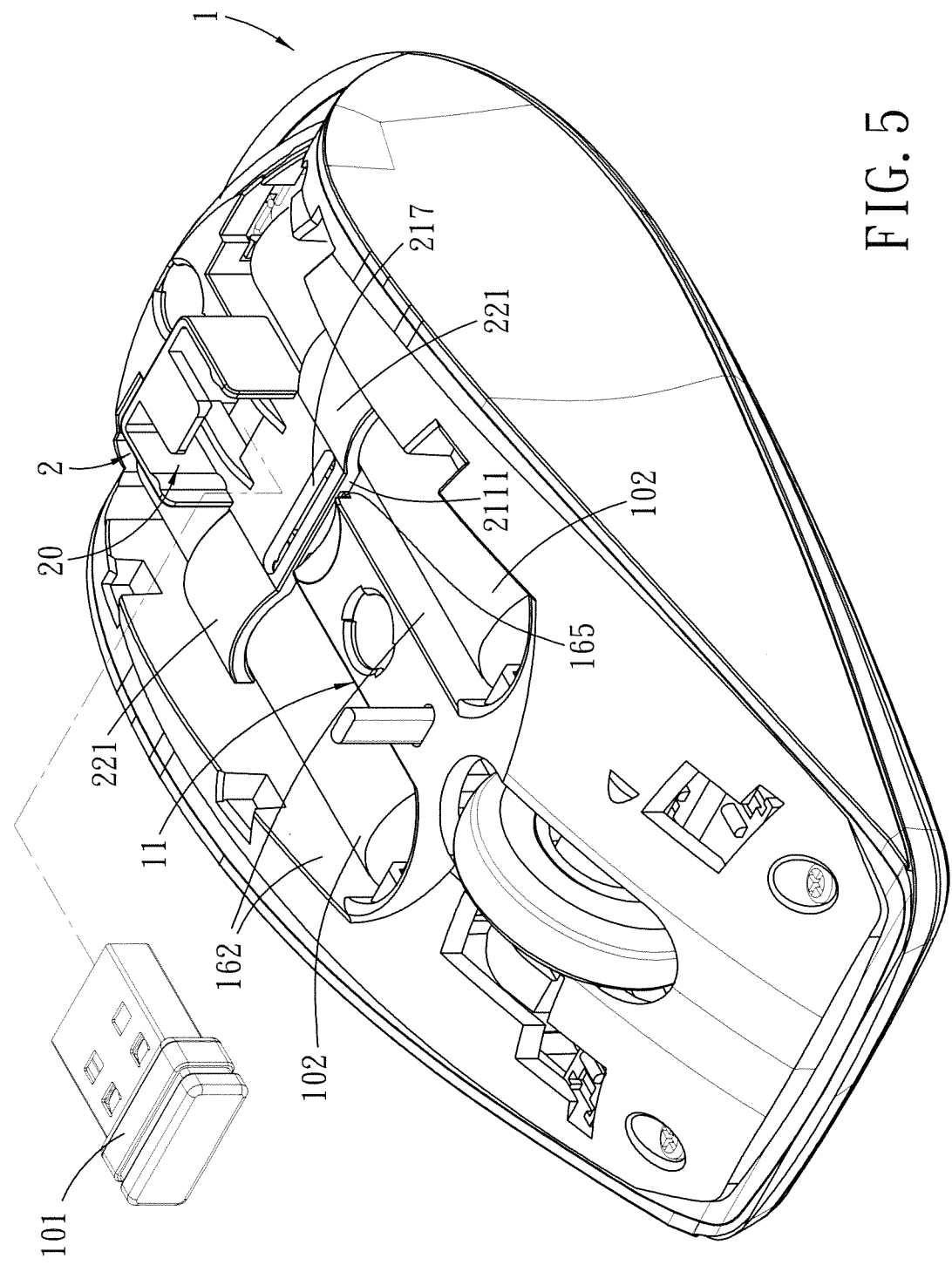
FIG. 5 is a perspective view showing the battery fastener connected with the base of the wireless mouse.

The base 1 has a top portion 11 that is formed with a downwardly recessed battery container unit 12, a first engaging portion 13 and a second engaging portion 14. The battery container unit 12 is for receiving a battery unit therein. In this embodiment, the battery unit includes two batteries 102 (see FIG. 5), and the base 1 includes a bottom housing 15, a top housing 16 connected to the bottom housing 15, an electronic module 17 disposed between the bottom housing 15 and the top housing 16, and a scrolling wheel 18. Other components may also be included in the base 1 in other embodiments.

The top housing 16 is formed with a wall portion that extends along a front-to-rear direction, and two battery slots 162 disposed respectively located at two sides of the wall portion. The battery slots 162 constitute the battery container unit 12, and the wall portion constitutes the top portion 11. The top portion 11 has a first top wall 163, a second top wall 160 disposed behind the first top wall 163, and a third top wall 164 that is disposed between and located below the first and second top surfaces 163 and 160. In other words, a part of the top portion 11 has a downwardly recessed structure. The third top wall 164 cooperates with the first and second top surfaces 163, 160 to define a first step portion 165 and a second step portion 166, respectively. In this embodiment, the first engaging portion 13 is an aperture formed in the third top wall 164 and close to the first step portion 165, and the second engaging portion 14 is an aperture formed in the third top wall 164 and close to the second step portion 166.

Figure 3:
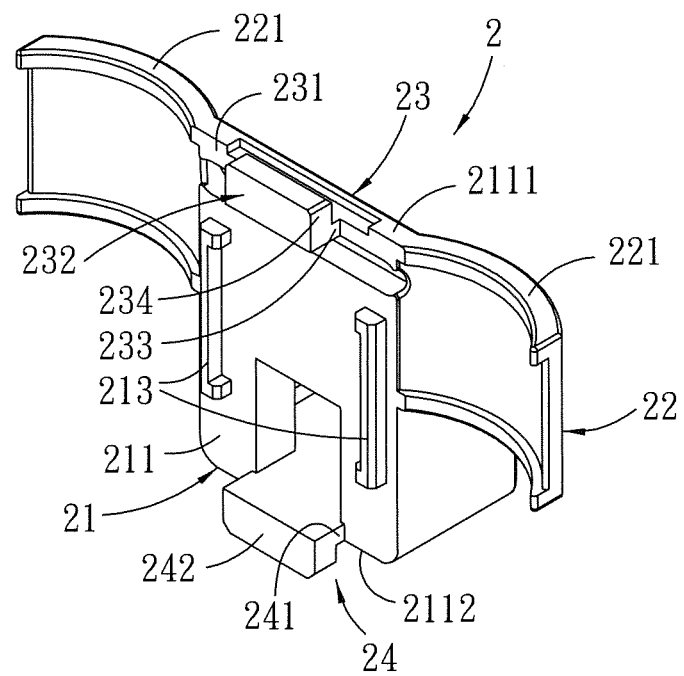
FIG. 3 is a perspective view of the battery fastener in FIG. 2, viewed from another angle.

Further referring to FIG. 3, the battery fastener 2 includes a fastener body 21, a blockade unit 22, a resilient engaging portion 23 and a third engaging portion 24. The resilient engaging portion 23 is for engaging the first engaging portion 13, and the third engaging portion 24 is for engaging the second engaging portion 14, such that the fastener body 21 is connected removably with the top portion 11 of the base 1. The blockade unit 22 extends from the fastener body 21 and is disposed directly above the battery container unit 12 so as to prohibit the batteries 102 from exiting the battery container unit 12.

Specifically, the fastener body 21 has a base wall 211 and a shell part 25 disposed on the base wall 211. The shell part 25 and the base wall 211 cooperate to define an insert groove 20 for receiving a wireless receiver 101. In this embodiment, the wireless receiver 101 is a USB nano dongle that can be plugged into a computer via a universal serial bus (USB) for transceiving signal with the wireless mouse 100. The base wall 211 has a front edge 2111 and a rear edge 2112. The shell part 25 includes a rear wall 251, a pair of opposing side walls 252, a top wall 253, and a pair of elongated projections 254 disposed respectively near front edges of the side walls 252, extending upwardly from the base wall 211 and facing each other. The rear wall 251 and the side walls 252 extend upwardly from the base wall 211. The top wall 253 extends forwardly from a top end of the rear wall 251. In other words, the rear wall 251 and the side walls 252 are arranged to form a generally U-shaped structure. The base wall 211, the rear wall 251, the side walls 252, and the top wall 253 cooperate to define the insert groove 20.

The fastener body 21 further includes a plurality of supporting ribs 212 and two guiding ribs 213. The supporting ribs 212 are disposed on a top surface of the base wall 211 between the side walls 252, extending along a front-to-rear direction, and spaced apart from each other along a left-to-right direction. The guiding ribs 213 are disposed on a bottom surface of the base wall 211, extending along the front-to-rear direction, and spaced apart from each other along the left-to-right direction. The functions of the supporting ribs 212 and the guiding ribs 213 will be described later.

The resilient engaging portion 23 includes a resilient bar 231 and a protrusion 232 extending from the resilient bar 231. In this embodiment, the base wall 211 is formed with an elongated slot 217 adjacent to and extending in a direction parallel to the front edge 2111. The elongated slot 217 has two closed ends so as to define the resilient bar 231 at a front distal end of the base wall 211. In other words, the resilient bar 231 is a part of the base wall 211 that defines a part of the front edge 2111. The protrusion 232 is generally L-shaped, and has a first protrusion segment 233 extending downwardly from the resilient bar 231, and a second protrusion segment 234 extending forwardly from a lower end of the first protrusion segment 233. The elongated slot 217 allows the resilient bar 231 and the protrusion 232 to move resiliently when subjected to an external force.

In this embodiment, the third engaging portion 24 is generally L-shaped, and has a third engaging segment 241 extending downwardly from the rear edge 2112 of the base wall 211 for an adequate length, and a fourth engaging segment 242 extending rearwardly from a lower end of the third engaging segment 241. It is worth noting that, the locations of the resilient engaging portion 23 and the third engaging portion 24 are interchangeable. The blockade unit 22 includes two stop plates 221 extending respectively from two opposite sides of the base wall 211 of the fastener body 21. The stop plates 221 are made to have an arc-shape, and are each disposed in front of a respective one of the side walls 252.

Figure 4:
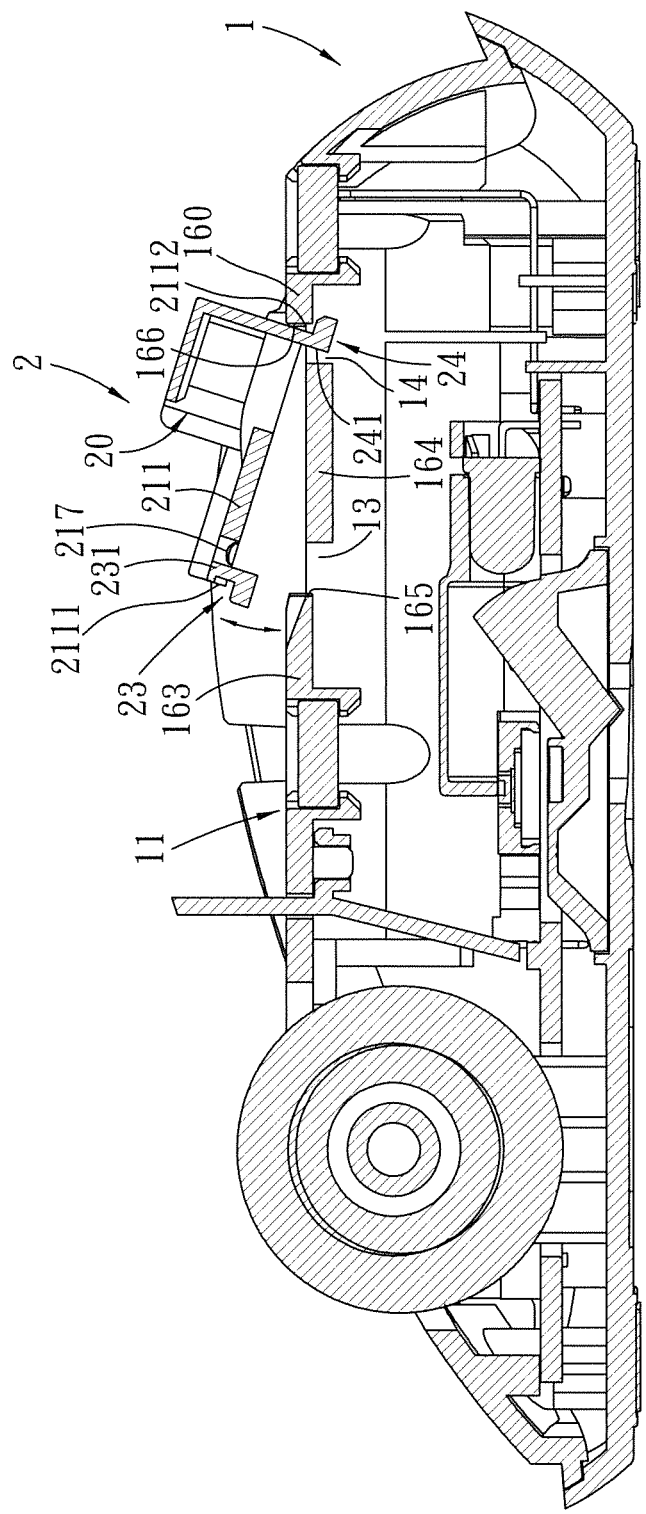
FIG. 4 is a sectional view illustrating the battery fastener connected with a base of the wireless mouse.

In this embodiment, a distance between the front edge 2111 and the rear edge 2112 of the base wall 211 is substantially equal to that between the first step portion 165 and the second step portion 166. Thus, in order to connect the battery fastener 2 to the top portion 11 of the base 1, the third engaging portion 24 is first engaged with the second engaging portion 14 of the base 1 (see FIG. 4). The resilient bar 231 is then pushed rearwardly to move resiliently toward the third engaging portion 24, allowing the protrusion 232 to engage with the first engaging portion 13. Hence, the battery fastener 2 is connected removably with the top portion 11 of the base 1 (see FIG. 6). It is worth noting that, the second protrusion segment 234 and the fourth engaging segment 242 extend in opposite directions.

Figure 6:
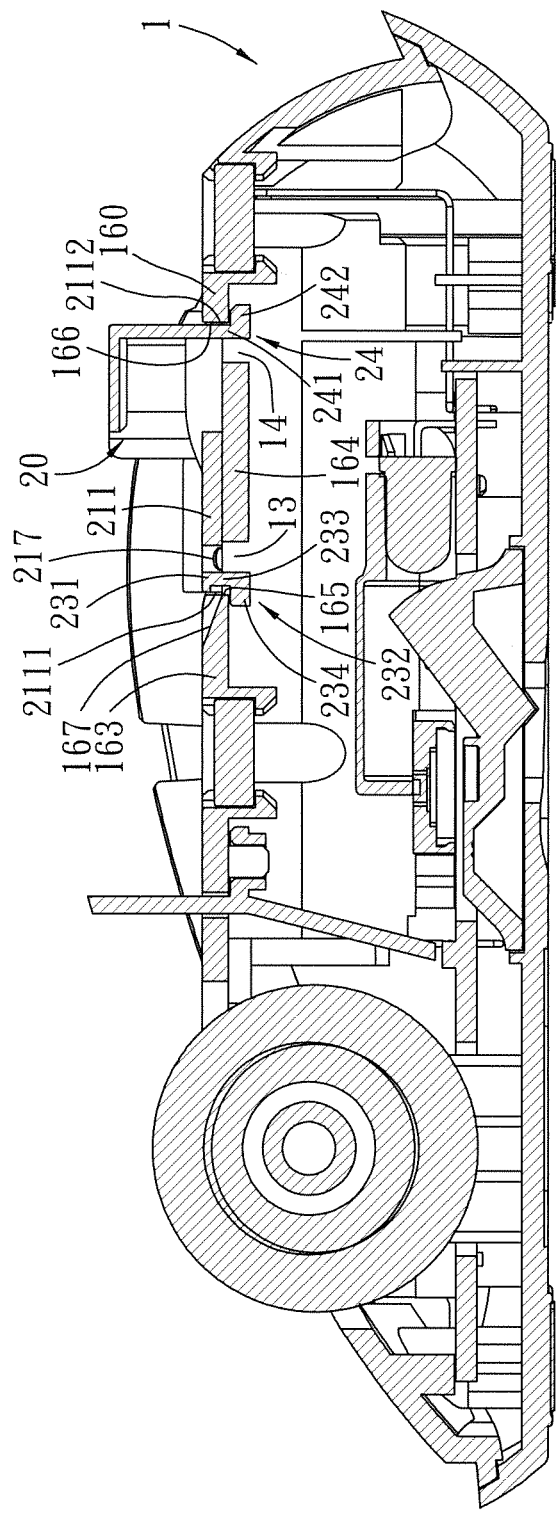
FIG. 6 is a sectional view of the battery fastener and the base of the wireless mouse in FIG. 5.

Referring to FIGS. 3 and 6, when the battery fastener 2 is connected with the top portion 11 of the base 1, the top portion 11 is between the guiding ribs 213; the resilient bar 231 and the rear edge 2112 of the base wall 211 abut against the first step portion 165 and the second step portion 166, respectively; the first protrusion segment 233 and the third engaging segment 241 are disposed through the first engaging portion 13 and the second engaging portion 14, respectively; the second protrusion segment 234 and the fourth engaging segment 242 are disposed below the first top wall 163 and the second top wall 160, respectively; and the stop plates 221 are disposed directly above the battery slots 162 of battery container unit 12 so as to prohibit the batteries 102 from exiting the battery slots 162.

When it is desired that the battery fastener 2 be disconnected from the top portion 11 of the base 1 (for replacement of the batteries 101 or other reasons), the resilient bar 231 is first pushed to move resiliently toward the third engaging portion 24, and the second protrusion segment 234 is disengaged from the first top wall 163. This allows the resilient bar 231 to be lifted from the first engaging portion 13 (see FIG. 4), and subsequently allows the third engaging portion 24 to be lifted from the second engaging portion 14, thereby disconnecting the battery fastener 2 from the top portion 11 of the base 1.

Figure 7:
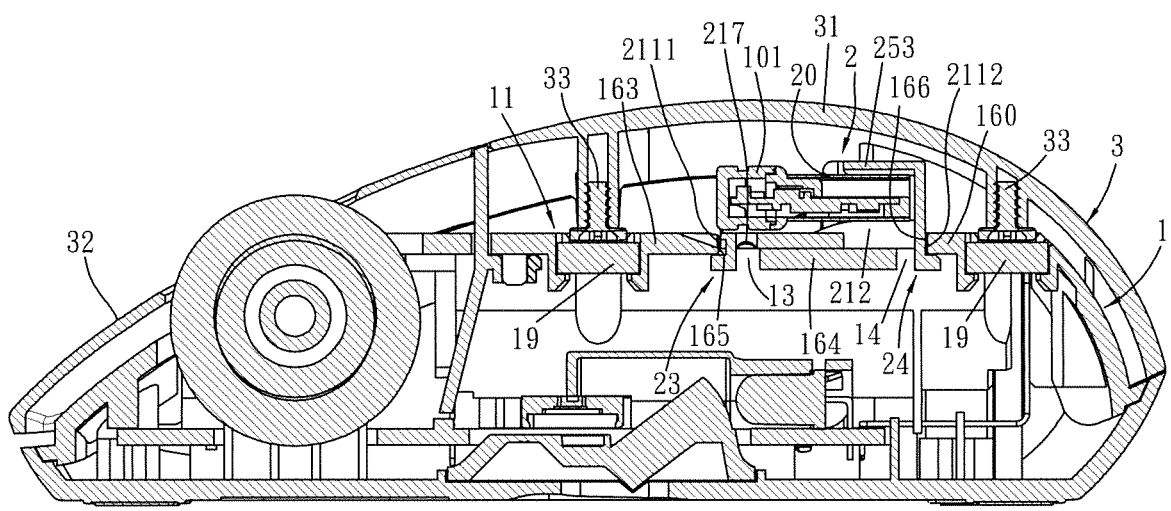
FIG. 7 is another sectional view similar to FIG. 6, further illustrating a wireless receiver received in the battery fastener and a top cover covering a top portion of the base.

Referring to FIGS. 1 and 7, the top cover 3 is connected removably with the top portion 11 of the base 1. In this embodiment, the top cover 3 includes a top board 31 and two movable parts 32 that extend forwardly from the top board 31 and that serve as the two click buttons of the wireless mouse 100. When the top cover 3 is connected with the top portion 11, the top board 31 is configured to cover the battery slots 162 of the battery container unit 12. The top portion 11 includes a magnet 19, and the top board 31 includes a ferromagnetic element 33, such that the top cover 3 and the base 1 are connected by attracting magnetic forces. When the top cover 3 engages the base 1, the battery fastener 2 is located between the top portion 11 of the base 1 and the top cover 3. Further referring to FIG. 2, when the wireless receiver 101 is received in the insert groove 20, the projections 254 of the side walls 252 abut respectively against two opposite sides of the wireless receiver 101. Additionally, the top wall 253 and the supporting ribs 212 position the wireless receiver 101 therebetween along a vertical direction.

In brief, the battery fastener 2 can simultaneously prevent the batteries 102 from exiting the battery container unit 12 through the stop plate 22, and receive the wireless receiver 101 in the insert groove 20.

Figure 8:
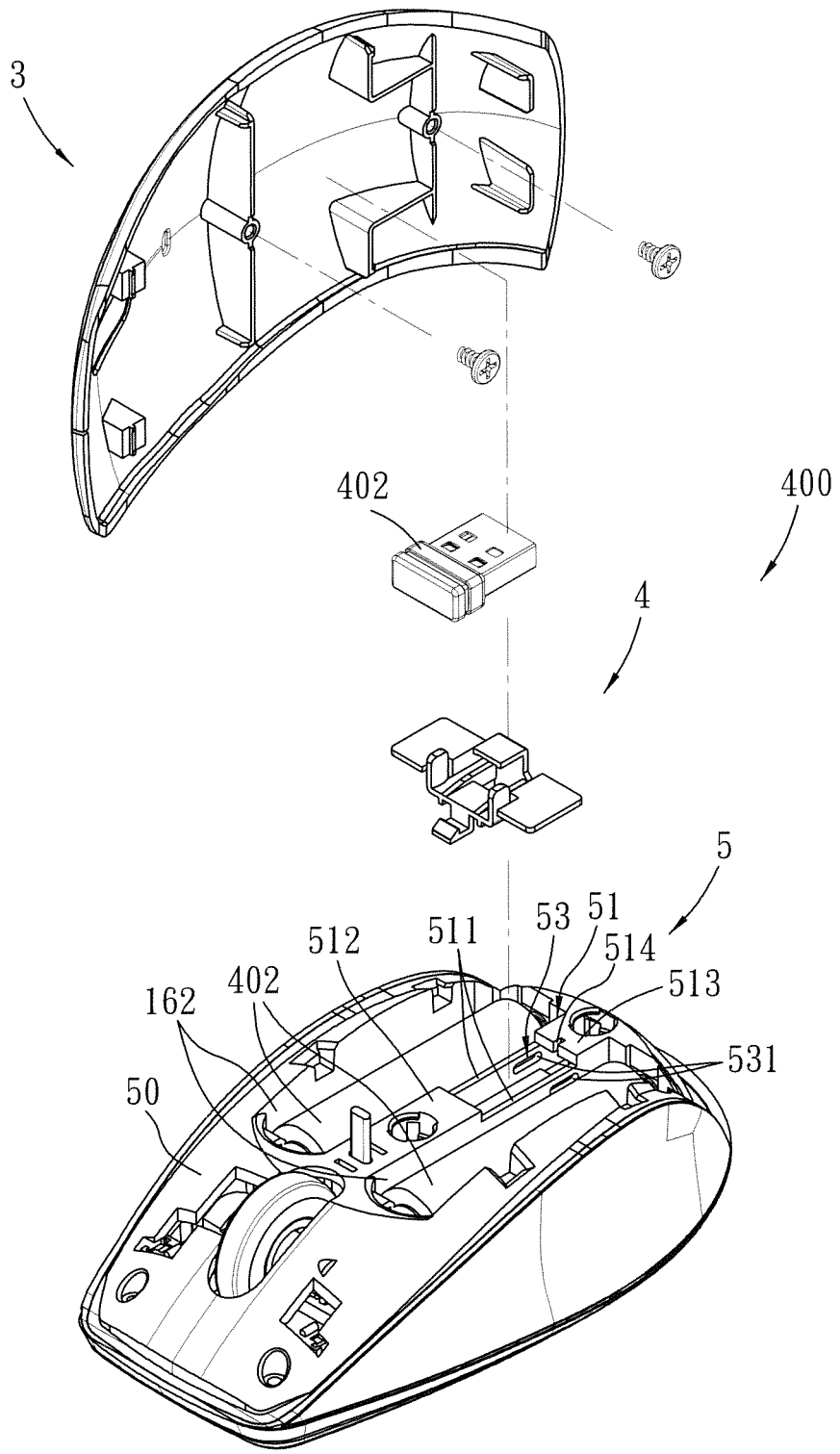
FIG. 8 is a an exploded perspective view of a second embodiment of a wireless mouse according to the invention.
Figure 9:
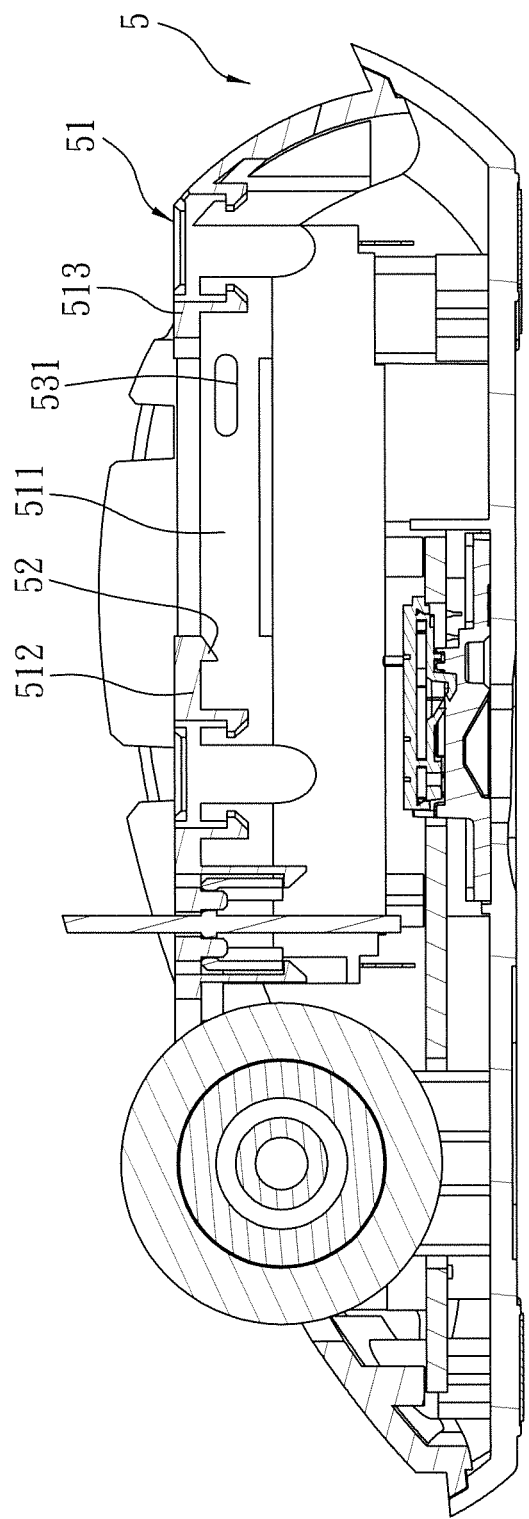
FIG. 9 is a sectional view of a base of the second embodiment.

As shown in FIGS. 8 and 9, the second preferred embodiment of a wireless mouse 400 according to the present invention has a structure similar to that of the first embodiment. The main difference between this embodiment and the previous embodiment resides in the configuration of a battery fastener 4 and a top portion 51 of a base 5.

In this embodiment, the base 5 includes a top housing 50 that is formed with the top portion 51 and two battery slots 162. The top portion 51 of the base 5 includes a pair of lateral walls 511 that are spaced apart from each other along a left-to-right direction, and a first top wall 512 and a second top wall 513 that are connected to the lateral walls 511 and that are spaced apart from each other along a front-to-rear direction. The battery fastener 4 is connected slidably with the top portion 51 of the base 5.

The top portion 51 of the base 5 further includes a first engaging portion 52 and a first pivot portion 53. In this embodiment, the first engaging portion 52 is a protruding block disposed at a bottom side of the first top wall 512, and the first pivot portion 53 includes two slide grooves 531 each disposed at a corresponding one of the lateral walls 511 and at a location near the second top wall 513. The slide grooves 531 extend along the front-to-rear direction.

Figure 10:
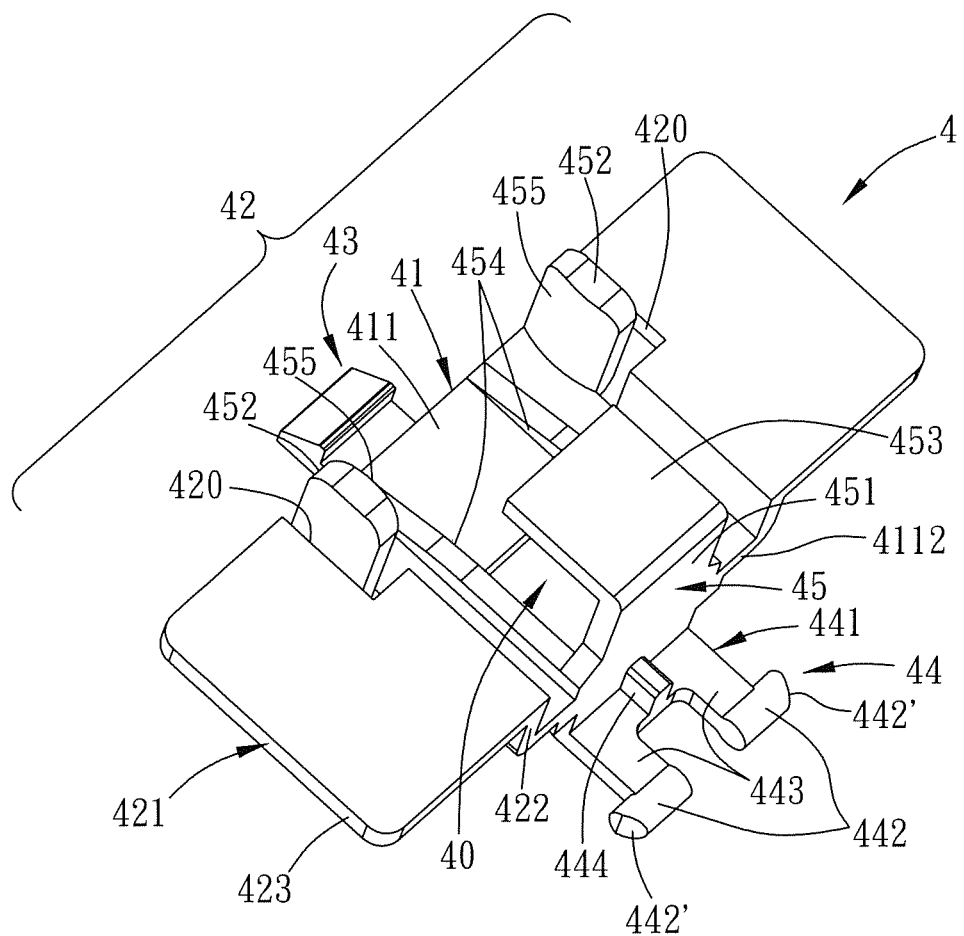
FIG. 10 is a perspective view of a battery fastener of the second embodiment.
Figure 11:
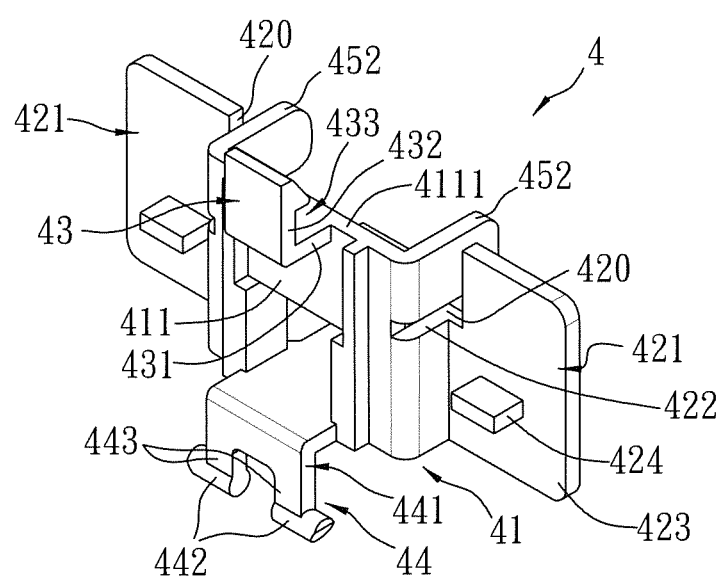
FIG. 11 is a perspective view of the battery fastener in FIG. 10, viewed from another angle.

Further referring to FIGS. 10 and 11, the battery fastener 4 includes a fastener body 41, a blockade unit 42, a second engaging portion 43, a second pivot portion 44, and a shell part 45.

The fastener body 41 includes a base wall 411. The base wall 411 has a front edge 4111 and a rear edge 4112. The second engaging portion 43 has a first protrusion segment 431 extending downwardly from a lower end of the front edge 4111 of the base wall 411, and a second protrusion segment 432 extending forwardly from a front end of the first protrusion segment 431. The second protrusion segment 432 includes a hooking segment 433 extending upwardly from the second protrusion segment 432. The second pivot portion 44 includes an extending plate 441 that is connected to and extends rearwardly from the base wall 411. The extending plate 441 includes two plate segments 443 that are spaced apart from each other along the left-to-right direction. Each of the plate segments 443 is formed with a pivot shaft 442 at a rear end thereof. That is, the extending plate 441 has a U-shaped structure. Each pivot shaft 442 is cylindrical, and extends along the left-to-right direction. The pivot shafts 442 have inner ends proximate to each other and connected respectively to the plate segments 443, outer ends distal from each other and projecting from the plate segments 443 and away from each other, and inclined outer end surfaces 442'.

The shell part 45 and the base wall 411 cooperate to define an insert groove 40 for receiving a wireless receiver 401. The shell part 45 includes a rear wall 451, a pair of opposing side walls 452 having arc surfaces 455 facing each other, a top wall 453, and two supporting ribs 454.

The rear wall 451 extends upwardly from the rear edge 4112 of the base wall 411. The side walls 452 extend upwardly from the base wall 411, are disposed near the front edge 4111, and are spaced apart from the rear wall 451. The top wall 453 extends forwardly from a top end of the rear wall 451. The supporting ribs 454 are disposed on a top surface of the base wall 411 between the side walls 452, extend along a front-to-rear direction, and are spaced apart from each other along a left-to-right direction.

The blockade unit 42 includes two stop plates 421. Each of the stop plates 421 includes a vertical section 422 that extends upwardly from the base wall 411, a horizontal section 423 extending horizontally from a top side of the vertical section 422, and a pressing block 424 disposed on a bottom surface of the horizontal section 423. Each of the horizontal section 423 is formed with a notch for extension of a corresponding one of the side walls 452, such that, each of the stop plates 421 is spaced apart from a corresponding one of the side walls 452 to form a gap 420 therebetween. Each gap 420 extends in a three-dimension space.

Figure 12:
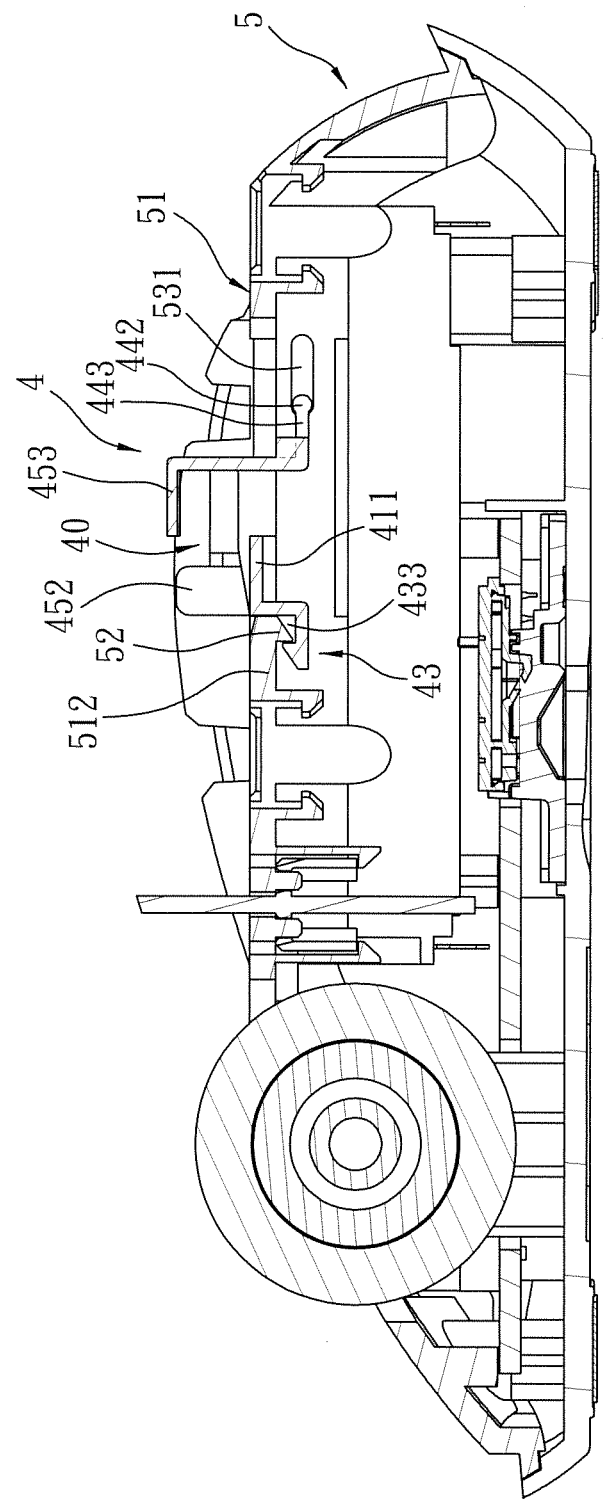
FIG. 12 is a sectional view showing the battery fastener in a first position.

Referring to FIGS. 8, 11 and 12, each the pivot shaft 442 is for engaging slidably a corresponding one of the slide grooves 531. As such, the battery fastener 4 is connected to the top portion 51 of the base 5, and is connected pivotally to the top portion 51 of the base 5 (see FIG. 14). It is noted that, the extending plate 441 and the pivot shafts 442 are configured to make assembly of the second pivot portions 44 and the slide grooves 531 easier.

Figure 13:
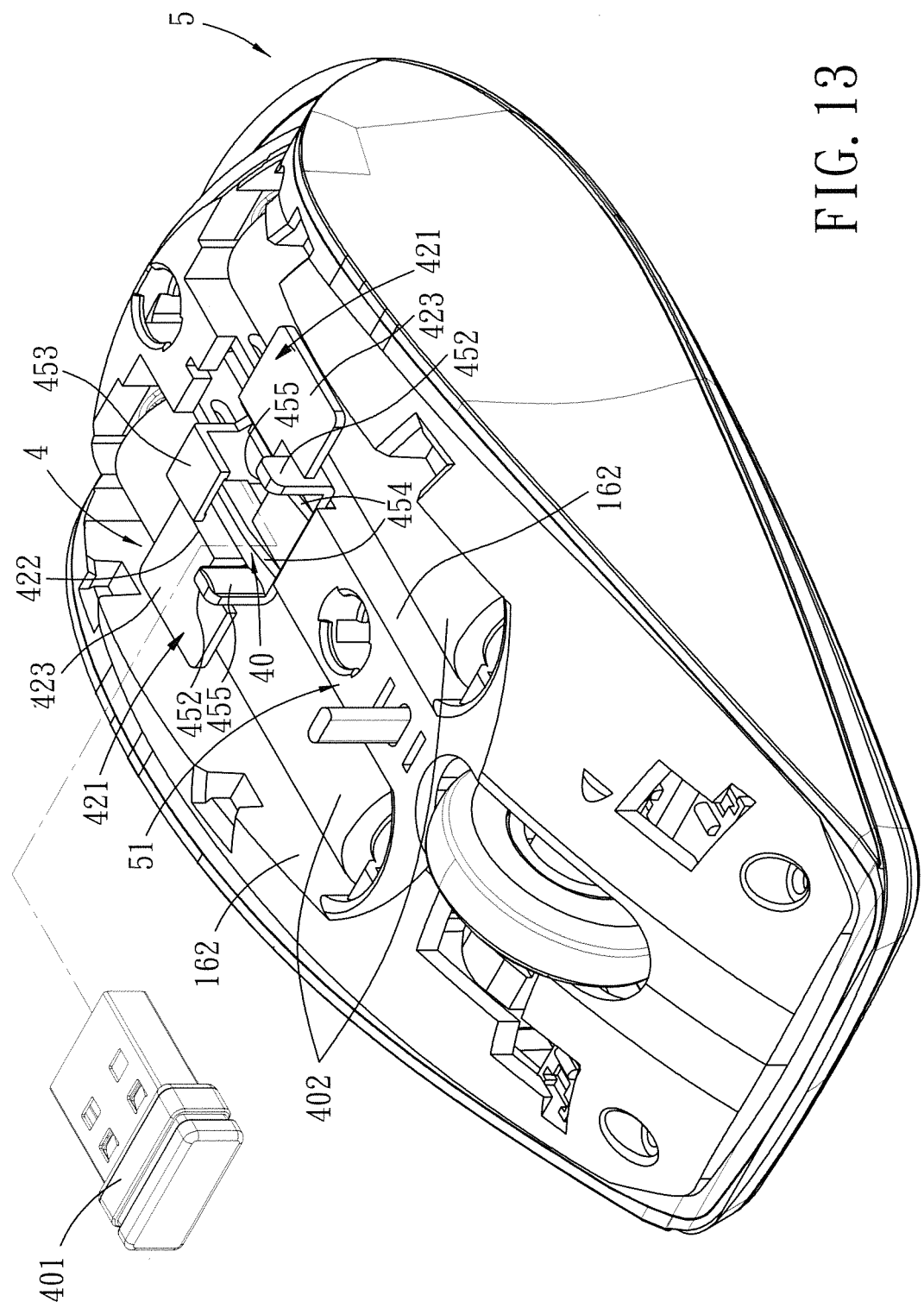
FIG. 13 is a perspective view showing the battery fastener in a first position.
Figure 14:
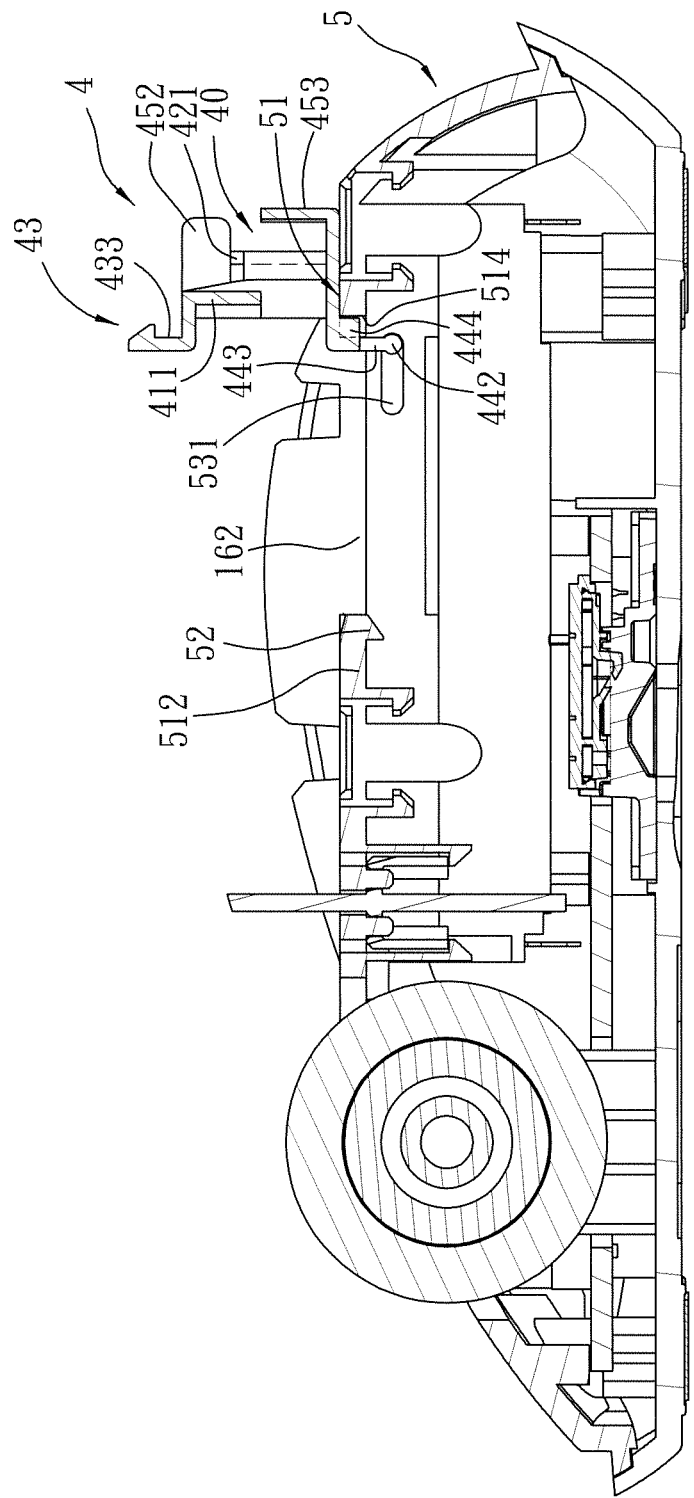
FIG. 14 is a sectional view showing the battery fastener in a second position.

The battery fastener 4 is movable relative to the top portion 51 of the base 5 between a first position (see FIGS. 11 to 13) and a second position (see FIGS. 8, 10 and 14). Specifically, when the battery fastener 4 is in the first position, the second engaging portion 43 of the battery fastener 4 engages the first engaging portion 52, and the pressing blocks 424 contact the batteries 402, respectively. Each of the horizontal sections 423 of the stop plates 421 of the blockade unit 42 covers a part of a corresponding one of the battery slots 162 for prohibiting the batteries 402 to leave said battery container unit. When the battery fastener 4 is in the second position, the stop plates 421 of the blockade unit 42 uncovers the battery slots 162 for allowing the batteries 402 to leave the battery slots 162. When the batteries 402 contained by the battery fastener 4 need replacement, a front part of the base wall 411 is first pushed downwardly, to disengage the second engaging portion 43 of the battery fastener 4 from the first engaging portion 52. The battery fastener 4 is then moved backwardly along the slide groove 531, and is pivoted upwardly with respect to the top portion 51 of the base 5, so that the battery fastener 4 is in the second position, and the batteries 402 can be removed from the battery slots 162.

In order to maintain the battery fastener 4 in the second position, in this embodiment, the battery fastener 4 further includes a protrusion 444 connected to and extending upwardly from the extending plate 441, and the top portion 51 of the base 5 is formed with a recess 514 for engaging with the protrusion 444 when the battery fastener 4 is in the second position. In this manner, the engaging structure of the protrusion 444 and the recess 514 can help maintain the battery fastener 4 is in the second position.

Figure 15:
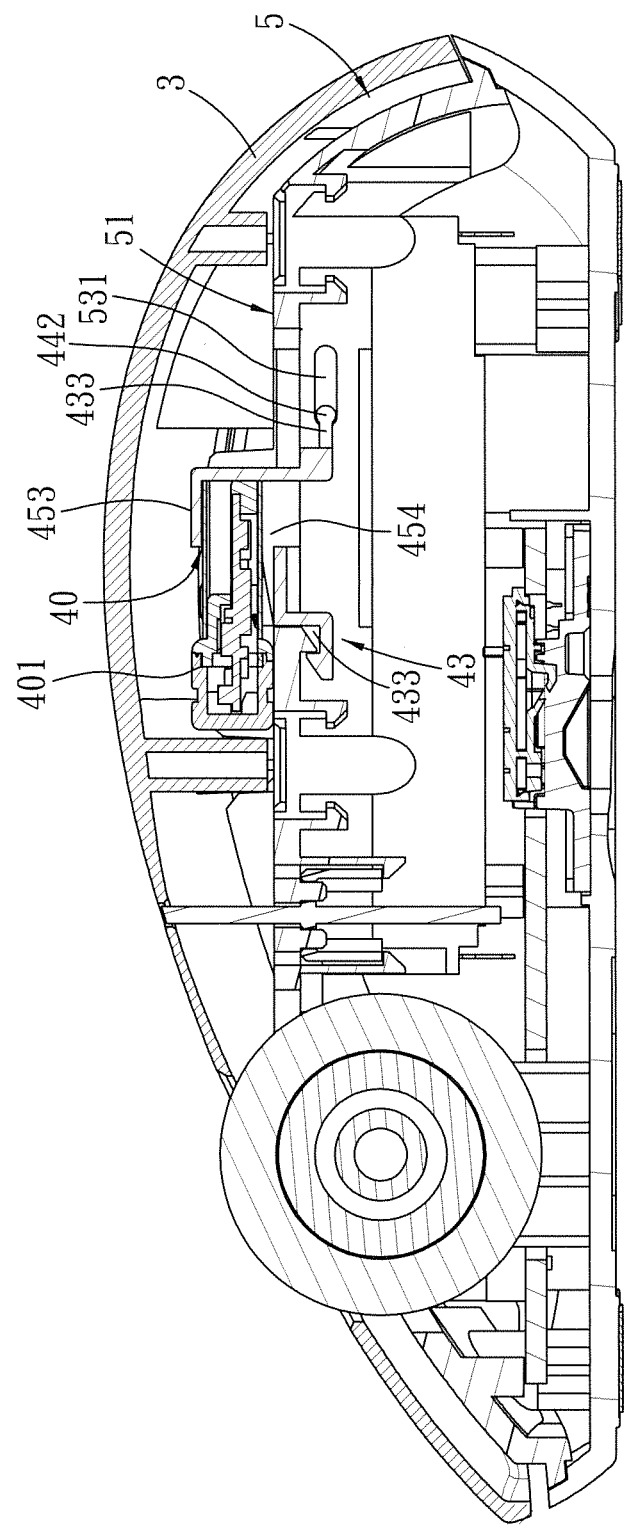
FIG. 15 is another sectional view similar to FIG. 6, further illustrating a wireless receiver received in the battery fastener and a top cover covering a top portion of the base.

Referring to FIGS. 13 and 15, the wireless receiver 401 can be inserted into the insert groove 40 when the battery fastener 4 is connected to the top portion 51 of the base 5. The wireless receiver 401 is disposed between and in contact with the arc surfaces 455 of the side walls 452 and the vertical sections 422 of the stop plates 421 along the left-to-right direction. The wireless receiver 401 is disposed between and in contact with the top wall 453 and the support ribs 454. When the top cover 3 is connected with the base 5, the battery fastener 4 and the wireless receiver 401 are located between the top portion 51 of the base 5 and the top cover 3. The gaps 420 allow the side walls 452 to be pushed outwardly by the wireless receiver 401 without physically affecting other components of the battery fastener 4.

It is worth noting that, in this embodiment, the slide grooves 531 are introduced such that the battery fastener 4 can be connected with the top portion 51 of the base 5 through a forward siding motion. Nonetheless, in other embodiments, the first and the second engaging portions 52, 43 can be replaced by the first engaging portion 13 and the resilient engaging portion 23 described in the first embodiment. With this configuration, the battery fastener 4 can be connected with the top portion 51 of the base 5 in a manner as described in the first embodiment.

The second preferred embodiment has the same advantages as those of the first preferred embodiment.

To sum up, the present invention introduces the battery fasteners 2 and 4, and the blockade units 22 and 42 to prevent the batteries 102, 402 from exiting the battery slots 162. The battery fasteners 2, 4 cooperate to define the insert grooves 20 and 40 for receiving the wireless receiver 101 and 401 when not in use.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A wireless mouse adapted to contain a battery unit therein and comprising:
    a base having a top portion that is formed with a battery container unit;
    a battery fastener including a fastener body connected removably with said top portion of said base, and a blockade unit extending from said fastener body and disposed directly above said battery container unit so as to prohibit the battery unit from exiting said battery container unit; and
    a top cover connected removably with said base for covering said battery container unit, wherein, when said top cover is connected with said base, said battery fastener is located between said top portion of said base and said top cover;
    wherein said top portion of said base is further formed with a first engaging portion and a second engaging portion, said fastener body of said battery fastener including a resilient engaging portion for engaging said first engaging portion and a third engaging portion for engaging said second engaging portion, such that said fastener body is connected removably with said top portion of said base;
    said top portion of said base further has a first top surface, a second top surface and a third top surface that is disposed between and located below first and second top surfaces;
    said third top surface cooperates with said first and second top surfaces to define a first step portion and a second step portion, respectively;
    said first and second engaging portions are disposed at said third top surface, and are close to said first and second step portions, respectively;
    said fastener body has a base wall formed with a front edge and an elongated slot adjacent to and extending in a direction parallel to said front edge, said elongated slot having two closed ends so as to define a resilient bar at a front distal end of said base wall, said resilient engaging portion including said resilient bar and a protrusion extending from said resilient bar; and
    when said fastener body is connected with said top portion of said base, said base wall is located between said first and second step portions.

2. The wireless mouse as claimed in claim 1, the battery unit including two batteries, wherein said battery container unit is formed with two battery slots adapted for receiving the two batteries, respectively, and said blockade unit includes two stop plates extending respectively from two opposite sides of said fastener body for covering said battery slots, respectively.

3. The wireless mouse as claimed in claim 2 and adapted for receiving a wireless receiver, wherein:
    said fastener body includes a base wall and a shell part disposed on said base wall;
    said shell part includes a rear wall, a pair of opposing side walls, and a top wall, said rear wall and said side walls extending upwardly from said base wall, said top wall extending forwardly from a top end of said rear wall, said rear wall and said side walls being arranged to form a generally U-shaped structure; and
    said base wall, said rear wall, said side walls, and said top wall cooperate to define an insert groove adapted for receiving the wireless receiver.

4. The wireless mouse as claimed in claim 3, wherein said fastener body further includes a plurality of supporting ribs disposed on a top surface of said base wall and spaced apart from each other along a left-to-right direction such that, when the wireless receiver is inserted into said insert groove, the wireless receiver is disposed between and in contact with said top wall and said support ribs.

5. A wireless input device adapted to contain a battery unit therein and comprising:
    a wireless mouse including:
        a base having a top portion that is formed with a battery container unit;
        a battery fastener including a fastener body connected removably with said top portion of said base, and a blockade unit extending from said fastener body and disposed directly above said battery container unit so as to prohibit the battery unit from exiting said battery container unit; and
    a top cover connected removably with said base for covering said battery container unit, wherein, when said top cover is connected with said base, said battery fastener is located between said top portion of said base and said top cover; and
    a wireless receiver received in said fastener body;
    wherein said top portion of said base is further formed with a first engaging portion and a second engaging portion, said fastener body of said battery fastener including a resilient engaging portion for engaging said first engaging portion and a third engaging portion for engaging said second engaging portion, such that said fastener body is connected removably with said top portion of said base;
    said top portion of said base further has a first top surface, a second top surface and a third top surface that is disposed between and located below first and second top surfaces;
    said third top surface cooperates with said first and second top surfaces to define a first step portion and a second step portion, respectively;

said first and second engaging portions are disposed at said third top surface, and are close to said first and second step portions, respectively;

said fastener body has a base wall formed with a front edge and an elongated slot adjacent to and extending in a direction parallel to said front edge, said elongated slot having two closed ends so as to define a resilient bar at a front distal end of said base wall, said resilient engaging portion including said resilient bar and a protrusion extending from said resilient bar; and when said fastener body is connected with said top portion of said base, said base wall is located between said first and second step portions.

6. The wireless input device as claimed in claim 5, the battery unit including two batteries, wherein said battery container unit is formed with two battery slots adapted for receiving the two batteries, respectively, and said blockade unit includes two stop plates extending respectively from two opposite sides of said fastener body for covering said battery slots, respectively.

7. The wireless input device as claimed in claim 6, wherein:
said fastener body includes a base wall and a shell part disposed on said base wall;
said shell part includes a rear wall, a pair of opposing side walls, and a top wall, said rear wall and said side walls extending upwardly from said base wall, said top wall extending forwardly from a top end of said rear wall, said rear wall and said side walls being arranged to form a generally U-shaped structure; and
said base wall, said rear wall, said side walls, and said top wall cooperate to define an insert groove for receiving the wireless receiver.

8. The wireless input device as claimed in claim 7, wherein said fastener body further includes a plurality of supporting ribs disposed on a top surface of said base wall and spaced apart from each other along a left-to-right direction such that, when the wireless receiver is inserted into said insert groove, the wireless receiver is disposed between and in contact with said top wall and said support ribs.

9. A wireless mouse adapted to contain a battery unit therein and comprising:
a base having a top portion that is formed with a battery container unit;
a battery fastener including a fastener body connected removably with said top portion of said base, and a blockade unit extending from said fastener body and disposed directly above said battery container unit so as to prohibit the battery unit from exiting said battery container unit; and
a top cover connected removably with said base for covering said battery container unit, wherein, when said top cover is connected with said base, said battery fastener is located between said top portion of said base and said top cover;
wherein said battery fastener is pivoted to said top portion of said base and is movable relative to said base between a first position, where said blockade unit covers said battery container unit for prohibiting the battery unit to leave said battery container unit, and a second position, where said blockade unit uncovers said battery container unit for allowing the battery unit to leave said battery container unit;
wherein said top portion of said base further includes a first engaging portion and a first pivot portion;
said base fastener body includes a base wall;
said battery container unit further includes a second pivot portion disposed at said base wall for engaging pivotally said first pivot portion, and a second engaging portion that is disposed at said base wall, that engages said first engaging portion when said battery fastener is in the first position, and that disengages from said first engaging portion when said battery fastener is in the second position;

said top portion further includes a pair of lateral walls that are spaced apart from each other along a left-to-right direction, and a first top surface and a second top surface that are connected to said lateral walls and that are spaced apart from each other along a front-to-rear direction;

said first engaging portion is disposed at said first top surface, said first pivot portion including two slide grooves each disposed at a corresponding one of said lateral walls and at a location near said second top surface; and said second pivot portion is pivoted in said slide grooves.

10. The wireless mouse as claimed in claim 9, the battery unit including two batteries, wherein said battery container unit is formed with two battery slots adapted for receiving the two batteries, respectively, and said blockade unit includes two stop plates extending respectively from two opposite sides of said fastener body for covering said battery slots, respectively.

11. The wireless mouse as claimed in claim 10 and adapted for receiving a wireless receiver, wherein:
said fastener body includes a base wall and a shell part disposed on said base wall;
said shell part includes a rear wall, a pair of opposing side walls, and a top wall, said rear wall and said side walls extending upwardly from said base wall, said top wall extending forwardly from a top end of said rear wall; and
said base wall, said rear wall, said side walls, and said top wall cooperate to define an insert groove adapted for receiving the wireless receiver.

12. The wireless mouse as claimed in claim 11, wherein said fastener body further includes a plurality of supporting ribs disposed on a top surface of said base wall and spaced apart from each other along a left-to-right direction such that, when the wireless receiver is inserted into said insert groove, the wireless receiver is disposed between and in contact with said top wall and said support ribs.

13. The wireless mouse as claimed in claim 9, wherein:
said second pivot portion includes an extending plate that is connected to and extends rearwardly from said base wall, and said extending plate includes two plate segments that are spaced apart from each other along the left-to-right direction, each of said plate segments being formed with a pivot shaft for engaging slidably a corresponding one of said slide grooves; and
said battery fastener further includes a protrusion connected to and extending upwardly from said extending plate, and said second top surface is formed with a recess for engaging with said protrusion when said battery fastener is in the second position.

14. The wireless mouse as claimed in claim 11, wherein:
each of the stop plates is spaced apart from a corresponding one of said side walls and forming a gap therebetween;
each of the stop plates includes a vertical section that extends upwardly from said base wall, a horizontal section extending horizontally from a top side of said vertical section, and a pressing block disposed on a bottom surface of said horizontal section; and
said horizontal sections extend from said vertical sections away from each other and are disposed respectively and directly above said battery slots, and when the batteries are contained in said battery slots, said pressing blocks are configured to contact the batteries, respectively.

* * * * *

UNITED STATES PATENT AND TRADEMARK OFFICE
CERTIFICATE OF CORRECTION

| | |
|---|---|
| PATENT NO. | : 8,963,839 B2 |
| APPLICATION NO. | : 13/486268 |
| DATED | : February 24, 2015 |
| INVENTOR(S) | : Lin Liu and Chien-Hsin Lee |

It is certified that error appears in the above-identified patent and that said Letters Patent is hereby corrected as shown below:

IN THE TITLE PAGE:

Item (73), DELETE THE FIRST ASSIGNEE NAME "LITE-ON ELECTRONICS (GUANZHOU) LIMITED" AND INSERT THE CORRECTED NAME --LITE-ON ELECTRONICS (GUANGZHOU) LIMITED--

Signed and Sealed this
Thirteenth Day of October, 2015

Michelle K. Lee
*Director of the United States Patent and Trademark Office*